(12) United States Patent
Slabaugh et al.

(10) Patent No.: US 11,625,815 B2
(45) Date of Patent: Apr. 11, 2023

(54) IMAGE PROCESSOR AND METHOD

(71) Applicant: Huawei Technologies Co., Ltd., Shenzhen (CN)

(72) Inventors: Gregory Slabaugh, London (GB); Youliang Yan, Shenzhen (CN); Fenglong Song, Beijing (CN); Gang Chen, Beijing (CN); Jiangwei Li, Beijing (CN); Tao Wang, Beijing (CN); Liu Liu, Beijing (CN); Ioannis Alexiou, London (GB); Ioannis Marras, London (GB); Sean Moran, London (GB); Steven George McDonagh, London (GB); Jose Costa Pereira, London (GB); Viktor Vladimirovich Smirnov, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 24 days.

(21) Appl. No.: 17/030,038

(22) Filed: Sep. 23, 2020

(65) Prior Publication Data
US 2021/0073957 A1    Mar. 11, 2021

Related U.S. Application Data

(63) Continuation of application No. PCT/EP2018/086490, filed on Dec. 21, 2018.

(51) Int. Cl.
*G06T 5/00* (2006.01)
*G06N 3/08* (2006.01)
(Continued)

(52) U.S. Cl.
CPC ............ *G06T 5/009* (2013.01); *G06N 3/084* (2013.01); *G06T 3/4015* (2013.01); *G06T 5/002* (2013.01);
(Continued)

(58) Field of Classification Search
None
See application file for complete search history.

(56) References Cited

U.S. PATENT DOCUMENTS

| 7,082,218 B2 | 7/2006 | Pollard et al. |
| 9,736,348 B2 | 8/2017 | Corcoran |
| | (Continued) | |

FOREIGN PATENT DOCUMENTS

CN    101366269 B    11/2010

OTHER PUBLICATIONS

Tan, Hanlin, et al. "Joint demosaicing and denoising of noisy bayer images with ADMM." 2017 IEEE International Conference on Image Processing (ICIP). IEEE, 2017. (Year: 2017).*

(Continued)

*Primary Examiner* — Andrae S Allison
(74) *Attorney, Agent, or Firm* — Leydig, Voit & Mayer, Ltd.

(57) ABSTRACT

An image processing apparatus and a method are provided. The apparatus comprises a plurality of processing modules configured to operate in series to refine a raw image captured by a camera, the modules comprising a first module and a second module, each of which independently implements a respective trained artificial intelligence model, wherein: the first module implements an image transformation operation that performs an operation from the set comprising: (i) an essentially pixel-level operation that increases sharpness of an image input to the module, (ii) an essentially pixel-level operation that decreases sharpness of an image input to the module, (iii) an essentially pixel-block-level operation on an image input to the module; and the second module as a whole implements a different operation from the said set.

19 Claims, 7 Drawing Sheets

(51) Int. Cl.
  *G06T 3/40* (2006.01)
  *H04N 9/64* (2006.01)
  *H04N 9/73* (2006.01)
  *G06N 3/084* (2023.01)
  *H04N 23/88* (2023.01)
(52) U.S. Cl.
  CPC ............ *G06T 5/003* (2013.01); *H04N 9/646* (2013.01); *H04N 23/88* (2023.01); *G06T 2207/10024* (2013.01); *G06T 2207/20081* (2013.01); *G06T 2207/20084* (2013.01)

(56) References Cited

U.S. PATENT DOCUMENTS

| | | | | |
|---|---|---|---|---|
| 10,863,148 | B2* | 12/2020 | Chuang | H04N 5/357 |
| 2008/0088857 | A1 | 4/2008 | Zimmer et al. | |
| 2010/0066857 | A1* | 3/2010 | Ovsiannikov | H04N 9/67 348/223.1 |
| 2010/0092082 | A1* | 4/2010 | Hirakawa | G06T 3/4015 382/167 |
| 2015/0215590 | A1 | 7/2015 | Nowozin et al. | |
| 2017/0278224 | A1 | 9/2017 | Onzon et al. | |
| 2019/0319633 | A1* | 10/2019 | Zou | H03M 1/08 |
| 2019/0387205 | A1* | 12/2019 | Chuang | H04N 9/045 |

OTHER PUBLICATIONS

Hasinoff, Samuel W., et al. "Burst photography for high dynamic range and low-light imaging on mobile cameras." ACM Transactions on Graphics (ToG) 35.6 (2016): 1-12. (Year: 2016).*

Prakash et al., "Deep Learning Approach for Image Denoising and Image Demosaicing," International Journal of Computer Applications (0975-8887), vol. 168—No. 9, XP055539788, pp. 18-26 (Jun. 2017).

Gharbi et al., "Deep Joint Demosaicking and Denoising," ACM Trans. Graph., vol. 35, No. 6, Article 191, XP058306363, total 12 pages (Nov. 2016).

Schwartz et al., "DeepISP: Towards Learning End-to-End Image Processing Pipeline," arXiv:1801.06724v2 [eess.V], total 12 pages (Feb. 3, 2019).

Chen et al., "Learning to See in the Dark," arXiv:1805.01934v1 [cs.CV], Retrieved from the internet:https://arxiv.org/abs/1805.01934, total 10 pages (May 4, 2018).

Hasinoff et al., "Burst photography for high dynamic range and low-light imaging on mobile cameras," SA 16 Technical Papers, total 12 pages, Macao (Dec. 5 -8, 2016).

Zhang et al.,"Beyond a Gaussian Denoiser: Residual Learning of Deep CNN for Image Denoising," IEEE Transactions on Image Processing, vol. 26, No. 7, pp. 3142-3155, Institute of Electrical and Electronics Engineers, New York, New York (Jul. 2017).

Dong et al., "Joint Demosaicing and Denoising with Perceptual Optimization on a Generative Adversarial Network," arXiv:1802.04723v1 [cs.CV], total 12 pages (Feb. 13, 2018).

Jin et al., "A Review of an Old Dilemma: Demosaicking First, or Denoising First?," 2020 IEEE/CVF Conference on Computer Vision and Pattern Recognition Workshops (CVPRW) (Jun. 2020).

Mosleh et al., "Hardware-in-the-loop End-to-end optimization of Camera Image Processing Pipelines," 2020 IEEE/CVF Conference on Computer Vision and Pattern Recognition (CVPR) (Jun. 2020).

* cited by examiner (a)                    (b)

(a)  (b)

(a)

(b)

IMAGE PROCESSOR AND METHOD

CROSS-REFERENCE TO RELATED APPLICATIONS

This application is a continuation of International Application No. PCT/EP2018/086490, filed on Dec. 21, 2018, the disclosure of which is hereby incorporated by reference in its entirety.

FIELD OF THE INVENTION

Embodiments of this invention relate to image formation in digital photography, in particular to using trained artificial intelligence models to perform the stages of an Image Signal Processor (ISP) pipeline.

BACKGROUND

Digital cameras rely on an Image Signal Processor (ISP) pipeline to transform RAW data collected by the sensor into a high quality RGB image. Traditionally, an ISP is implemented using signal processing methods. However, advances in deep learning have resulted in new state-of-the-art approaches to many image processing methods that are part of a traditional ISP, such as demosaicing and denoising.

The standard approach to implementing an ISP is to use signal processing methods for the various stages of processing to form an image, as exemplified in FIG. 1, which shows a conventional ISP composed of a large set of operations implemented using signal processing methods. These methods run quickly. However, there are limitations on the image quality that they can produce. At the same time, it has become increasingly difficult to engineer a modern ISP pipeline using traditional methods, as ISP pipelines have grown in complexity.

Typically, an ISP has a large number of exposed parameters that require tuning for a new sensor. Therefore, conventional methods are limited by image quality and the difficult of tuning the ISP to produce high quality results.

Traditional methods may lack the image quality of a learned stage. A machine learning approach may simplify optimization by instead relying on large datasets. Some ISPs using artificial intelligence (AI) have been proposed.

DeepISP, as described in E. Schwartz, R. Giryes, A. Bronstein, "DeepISP: Learning End-to-End Image Processing Pipeline," ArXiv 2018, is a single-network deep learning approach that takes raw data and uses a simple method (bilinear interpolation) as input to a low-level network that performs denoising and demosaicing. Then, a high-level network learns the dynamic range correction and tone mapping. DeepISP models the ISP as a single neural network.

SID, as described in C. Chen, Q. Chen, J. Xu, V. Koltun, "Learning to See in the Dark," IEEE Conference on Computer Vision and Pattern Recognition (CVPR), 2018, is also a single-network deep learning approach that takes raw mosaiced low light data and transforms it through a convolutional neural network to produce an RGB image. Similar to DeepISP, SID models the ISP as a single neural network. Also, SID is designed specifically for extremely low light imaging scenarios, where an amplification factor is used to adjust image brightness. This factor must be tuned by hand depending on the brightness level and sensor.

In many image processing techniques relevant to an ISP, state-of-the-art performance is now achieved using deep learning. It is desirable to develop an improved ISP that is compatible with deep learning components to give a high-quality image.

SUMMARY OF THE INVENTION

According to a first aspect there is provided an image processor comprising a plurality of processing modules configured to operate in series to transform a raw image captured by a camera, the modules comprising a first module and a second module, each of which independently implements a respective trained artificial intelligence model, wherein: the first module implements an image transformation operation that performs an operation from the set comprising: (i) an essentially pixel-level operation that demosaics an image input to the module, (ii) an essentially pixel-level operation that denoises an image input to the module, (iii) an essentially pixel-block-level operation on an image input to the module; and the second module as a whole implements a different operation from the said set.

This approach may result in improved image quality. Using trained artificial intelligence models based on deep learning to perform the required operations in the modules has been shown to outperform traditional methods in most image enhancement tasks and the image processor produces high quality images with minimal artefacts.

The image processor may be configured to perform an automatic white balancing operation prior to demosaicing the image. This operation adjusts the image colours so that achromatic shades appear correct. This may improve the image quality.

The image processor may be configured to perform demosaicing of the image after de-noising the image. Demosaicing after RAW denoising may result in improved image quality.

A pixel-block-level operation is an operation performed on a block of pixels as a group. The block of pixels may be a block of contiguous pixels. It may be a rectangular block of pixels. The operation may take as input all pixels of a block. The operation may form an output block of pixels which may be the same size as the input block or a different size.

The essentially pixel-block-level operation may comprise dynamic range compression. This may allow the image to be displayed on standard devices.

The essentially pixel-block-level operation may comprise colour mapping. This may adjust colours in the image, resulting in a colour corrected RGB image that is suitable for display on standard devices, for example, with 256 levels per colour channel.

The image processor may be pipelined and each module except for the first module may be configured to take an input from a preceding module. This may result in efficient operation of the image processor.

The image processor may be configured to generate an output that is a compressed representation of an image input to the image processor. This may reduce the file size of the resulting image, allowing images to be stored more efficiently.

The image processor may further comprise a module configured to perform multi-frame noise reduction. This stage combines a burst of RAW frames to achieve noise reduction and is achieved using traditional image processing (image alignment and averaging). This may result in a single RAW frame with reduced noise.

The image processor may further comprise a module configured to increase the contrast to noise ratio of short exposure images. This may help to improve image quality, particularly in low light imaging.

The image processor may further comprise a module configured to enhance detail in the image. This may further improve the image quality.

The image processor may further comprise a module configured to perform super-resolution of the image. This allows the resolution of the image to be improved.

The image processor may further comprise a third module which independently implements a trained artificial intelligence model, wherein the third module implements an operation from said set, the operation implemented by the third module being a different operation from said set to the operations implemented by the first and second modules. The image processor is therefore a modular design with a small set of processing stages. The modules may be separate hardware modules.

One of the first and second modules may be configured to perform denoising of an image input to that module and the other of the first and second modules is configured to perform dynamic range compression of an image input to that module, wherein the image processor comprises a further module which implements a trained artificial intelligence model and is configured to perform denoising of an image input to the further module, and wherein the further module and the one of the first or second modules configured to perform denoising are pipelined such that they are positioned before and after the other of the first and second modules. This allows denoising to be performed on both RAW and RGB images in the pipeline, which may result in improved image quality.

The image processor may further comprise a module configured to perform an image sharpening operation. The input to this module may be an RGB frame. The output may be a sharpened RGB frame with enhanced detail.

According to a second aspect there is provided a method for refining a raw image captured by a camera in an image processor comprising a plurality of modules configured to operate in series, the modules comprising a first module and a second module, each of which independently implements a respective trained artificial intelligence model, the method comprising: implementing an image transformation operation at the first module that performs an operation from the set comprising: (i) an essentially pixel-level operation that demosaics an image input to the module, (ii) an essentially pixel-level operation that denoises an image input to the module, (iii) an essentially pixel-block-level operation on an image input to the module; and implementing as a whole at the second module a different operation from the said set.

This approach may result in improved image quality. Using trained artificial intelligence models based on deep learning to perform the required operations in the modules has been shown to outperform traditional methods in most image enhancement tasks and the image processor produces high quality images with minimal artefacts.

The AISP also better handles variation. Digital photographs have a large amount of variation, for example, they can be taken under varying conditions such as indoor/outdoor, daytime/night-time, zoomed in/out, etc. and the content in the photo can vary hugely. It is difficult for traditional algorithms to work consistently across these sources of variation. However, by learning from rich examples, deep learning methods can produce high quality results adaptively based on image content. There are no (or limited) parameters to tune. Deep learning models have a large number of parameters, however, these parameters are learned automatically during training.

BRIEF DESCRIPTION OF THE FIGURES

Embodiments of the present invention will now be described by way of example with reference to the accompanying drawings. In the drawings:

In FIG. 3(b), the mosaiced image is packed into four colour channels representing the R, G1, G2, and B colours. In the packed form, the spatial resolution of each colour channel is half the original mosaicked image resolution.

In FIG. 5(a), the input image is shown (after demosaicing for ease of visualization). In FIG. 5(b), the denoised image is shown (also after demosaicing).

FIG. 7(a) shows an image input to the demosaicing stage. FIG. 7(b) shows the resulting RGB image after applying the demosaicing network.

FIG. 9(a) shows an image input to this stage (brightened for visualization). After demosaicing, the RGB image has a large dynamic range, and in this visualization some parts of the image are underexposed (water left of the plant) and others are overexposed (sky in the background). FIG. 9(b) shows the output of this stage.

DETAILED DESCRIPTION OF THE INVENTION

Embodiments of the present invention relate to using an artificial intelligence-enabled ISP (AISP) using deep learning to produce state-of-the-art image quality.

Figure 1:
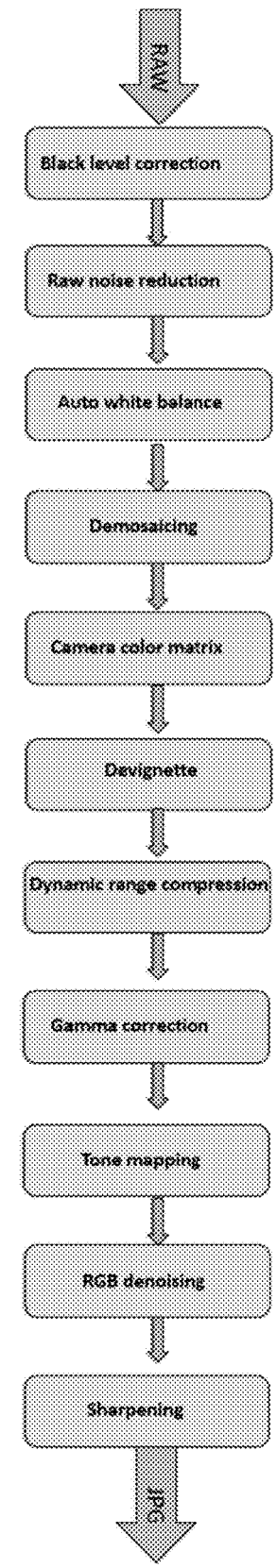
FIG. 1 shows a conventional ISP composed of a large set of operations implemented using signal processing methods.
Figure 2:
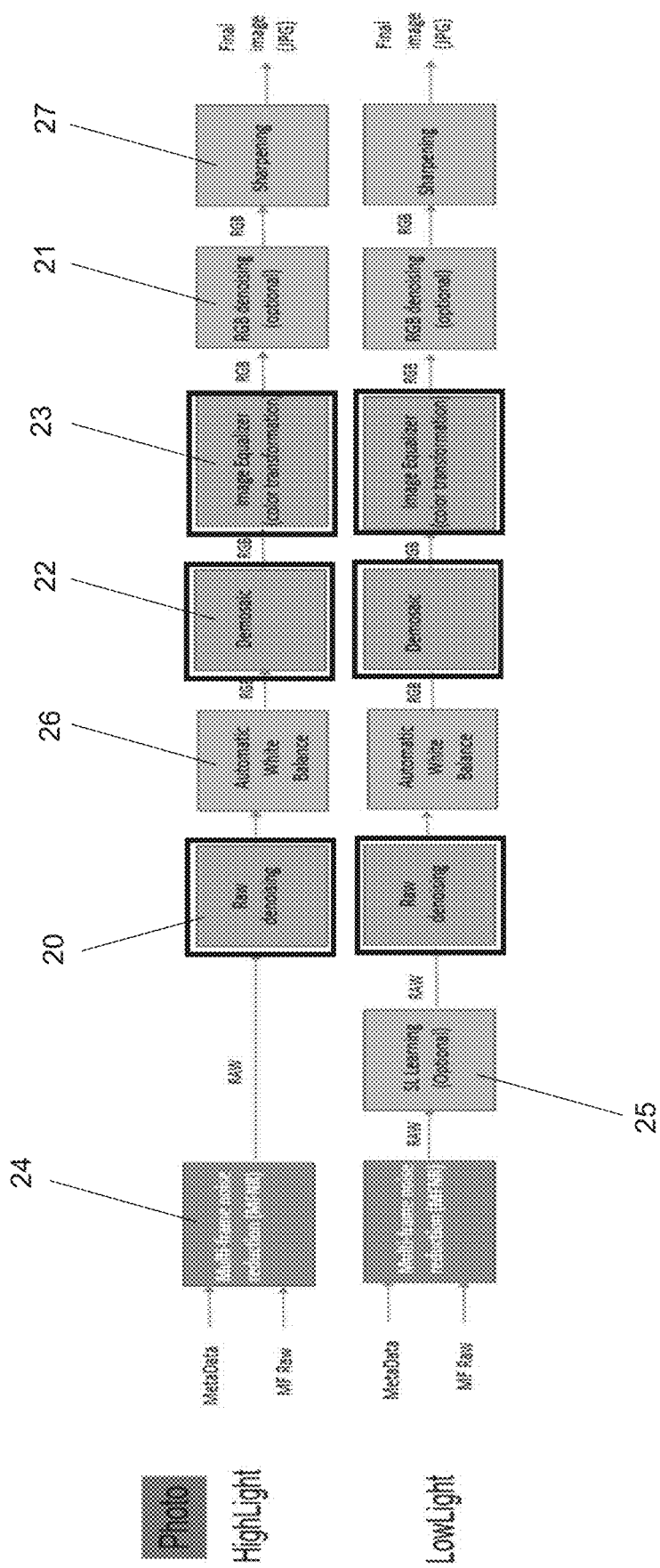
FIG. 2 illustrates a preferred embodiment of an image signal processor according to embodiments of the present invention.

A preferred embodiment of the pipeline is shown in FIG. 2. The pipeline includes a plurality of modules. The modules are separate modules. Each module is configured to implement a trained artificial intelligence model based on deep learning to transform RAW data into a high-quality image.

The primary modules of the AISP are as follows:

1) A denoising module, shown at 20 in FIG. 2. The denoise stage performs denoising on the data. This stage can be limited to denoising the RAW data, as shown at module 20, or optionally as an additional stage on RGB data, shown at 21. The input to the RAW denoising module is a noisy RAW image and the output is a denoised image. The RGB denoising stage, as shown at module 21, learns the mapping from a noisy image to a clean image based on the ISO setting of the camera. The input to the module 21 may be an RGB frame with residual noise (noise still present after optional multi-frame noise reduction, as described below, and RAW Denoising). The output of module 21 is a denoised RGB frame.

2) A demosaicing module, shown at 22. The demosaicing stage interpolates the values from the mosaic to produce an RGB image. The input to the demosaicing module is a RAW image, where each pixel has a red, green, or blue color. The output is an RGB image, where each pixel has a red, green, and blue color. This is a color image.

3) An image equalizer module, shown at 23. The image equalizer performs dynamic range compression and tone mapping to adjust colors in the image. It may also handle vignette correction and white balancing. The input to this module 23 is a RGB image with a large dynamic range and uncorrected colors (e.g. 1024 levels per color channel). The output is a color corrected RGB image with a dynamic range suitable for display on standard devices (e.g. 256 levels per color channel).

These primary modules can be organised in different orders within the pipeline.

The denoising 20 (and optionally 21), demosaicing 22 and image equalization 23 modules are configured to perform operations as described above. There are also further optional stages. The optional stages are described below. With the exception of the multi-frame noise reduction stage, these operations are based on deep learning.

A module configured to perform multi-frame noise reduction (MFNR), shown at 24, may combine a burst of RAW frames to achieve noise reduction. This stage is achieved using traditional image processing (image alignment and averaging). The input to this module is a burst of RAW frames (typically between 6 and 12 frames) and the output is a single RAW frame with reduced noise.

Optionally, for low light scenarios, a short/long exposure learning (SL learning) module 25 transforms short exposure images to long exposure images for scenes with low light. The SL learning stage learns the mapping from short to long exposure images. This is particularly important in low light imaging to retain detail. The input to this module is a RAW frame, captured with a short exposure (to avoid motion blur). The output is a RAW frame, with detail as if it had been captured with a long exposure.

An automatic white balance module 26 may adjust the image colors so achromatic shades (shades of gray) appear correct. The input to this module is a RAW frame, where each pixel has a red, green, or blue color. The output is a gain vector, which adjusts the red and blue colors to produce a corrected image.

An optional sharpening stage at module 27 can be used to increase detail in the image. This module is optional, as other parts of the AISP (SL learning, demosaicing) may provide sufficient sharpness for the final output image. The input to this module is an RGB frame. The output is a sharpened RGB frame with enhanced contrast.

The approach is applicable to both still photography and video. For still photography, the input to the pipeline may include a multi-frame (MF) burst of RAW images and MetaData, as shown in FIG. 2. For video, the input may be a single frame (SF) RAW file and MetaData, with earlier frames input an earlier time steps.

The operations of the denoising, demosaicing and image equalizer modules will now be described in more detail.

Figure 3:
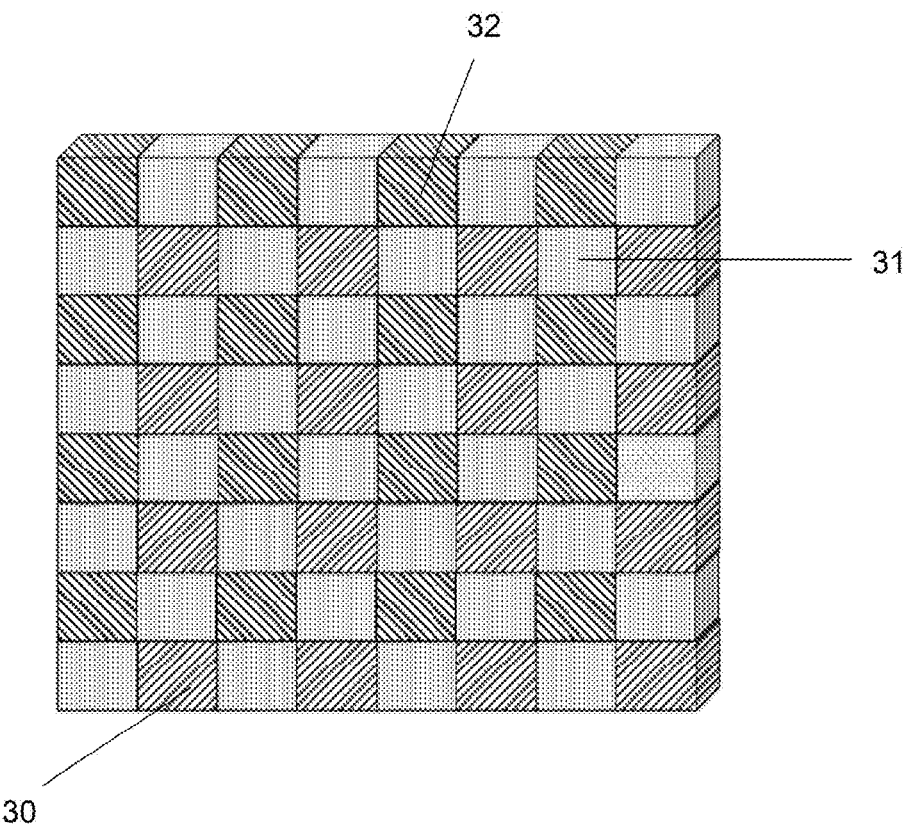
FIG. 3 (a) shows the standard Bayer pattern colour filter array on the sensor. At each pixel, either a blue, green, or red color is acquired. An image captured in this format is said to be mosaiced.
Figure 3:
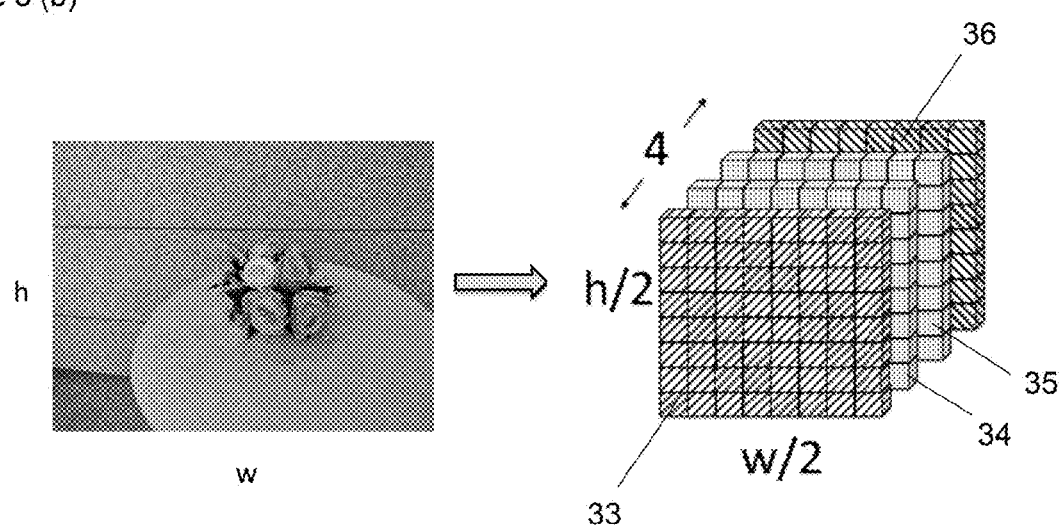

The denoising stage can be implemented as a convolutional neural network (CNN). In one non-limiting embodiment, the RAW data passed into the RAW denoiser module 20 is an image formed using a color filter array (CFA) that captures light of specific colors at each pixel, for example,
using the well-known Bayer pattern. FIG. 3 (*a*) shows the standard Bayer pattern colour filter array on the sensor. This pattern has a recurring 2×2 mosaic that is tiled across the image. At each pixel, either a red 30, green 31 or blue color 32 is acquired. An image captured in this format is said to be mosaiced. In FIG. 3(*b*), the mosaiced image is packed into four colour channels representing the R, G1, G2, and B colours, 33, 34, 35 and 36 respectively. In the packed form, the spatial resolution of each colour channel is half the original mosaicked image resolution.

The function of the RAW denoiser is to remove noise from the data captured using the CFA. Therefore, both the input and the output of the RAW denoiser will be a mosaiced image. Often the RAW data captured has a large dynamic range, for example, 10-bit data, which can represent 1024 different levels at each red, green, or blue colour.

There are many traditional approaches to denoising. One simple method for denoising involves local averaging using filters like a box or Gaussian filter. These methods achieve denoising through low-pass filtering, which will suppress high frequencies in the image, including noise. While effective at reducing noise, these filters also blur edges, which are also high frequencies, and therefore local averaging produces blurry results. Methods have been proposed for improved noise reduction while preserving important detail like edges in the image, including techniques such as anisotropic diffusion, bilateral filtering, and non-local means.

In contrast to traditional techniques, the AISP uses machine learning and relies on convolutional neural networks (CNNs) to process the image. A CNN learns a collection of filters, which are applied to the image through convolution. The convolution is designed to be spatially invariant, meaning the convolution has the same effect when applied to any location in the image. A potential problem however with applying convolutions on a mosaiced image is that the convolutions are no longer spatially invariant as a result of the CFA—for example, when the filter is centred on a blue pixel, it may have a different effect than when centred on a red pixel. A simple way to address this issue is to pack the data into like-colour channels, each of which can then be processed in the CNN using spatially invariant convolutions.

There are numerous ways to implement the RAW denoiser. One approach is to take the four packed channels shown in FIG. 3(*b*) as input, and produce an output with four packed channels, which can then be unpacked back to the original mosaic. An alternative method is to build a CNN that takes a single channel input and produce a single channel output. In the latter case, each of the four colour channels (R, G1, G2, B) are processed by the CNN. In the current embodiment, a CNN with a single input channel and single output channel is used.

Figure 4:
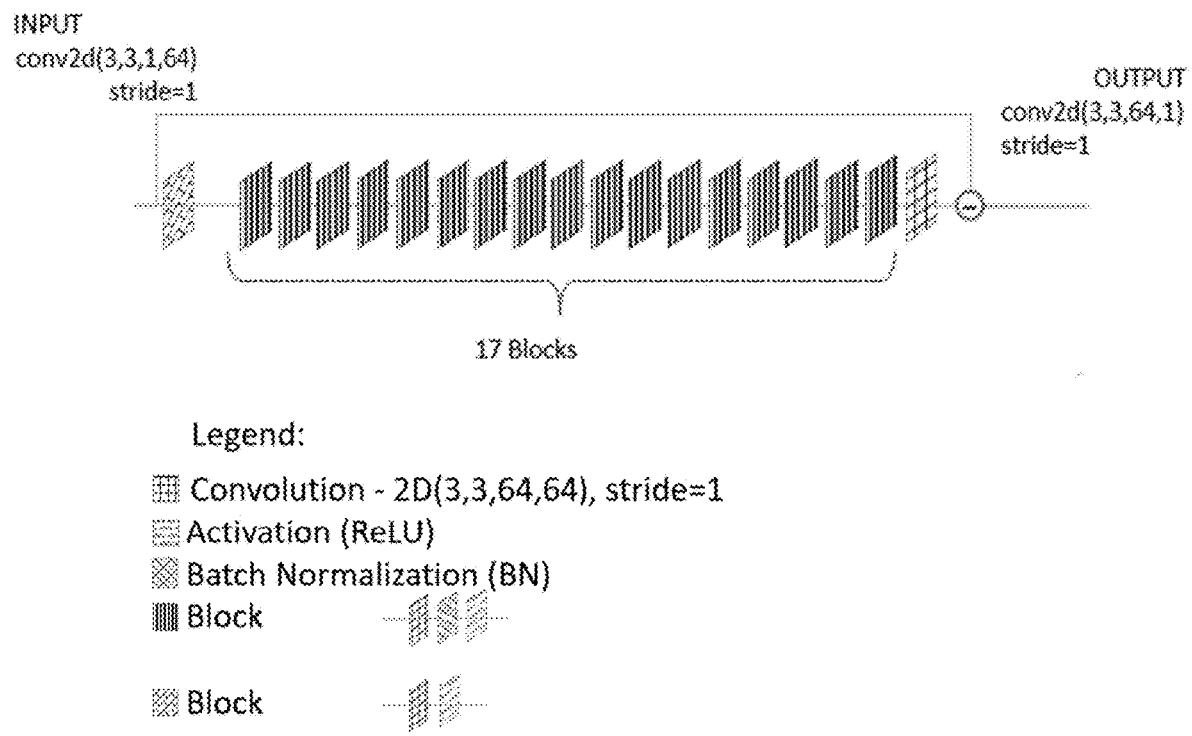
FIG. 4 illustrates a RAW denoiser architecture. One embodiment of the RAW denoiser takes a single channel as input and produces a single channel output.

A preferred embodiment of the RAW denoiser CNN design is presented in FIG. 4. This network takes a single channel input, which is the processed with 64 3×3 convolutional filters and ReLU activation. The 64 output channels are then processed by 17 layers that perform convolution with 64 3×3 filters, batch normalization, and rectified linear unit (ReLU) activation. This processing produces output channels that capture features inherent in the data and relevant to the denoising task. The final layer regresses the output, which is an estimate of the noise in the image due to the subtractive skip connection at the end of the network. At inference time, a noisy channel is input to the network, which then estimates the noise. Subtracting the noise from the noisy channel produces a denoised result. The process is repeated for all four channels (R, G1, G2, and B) in the original mosaiced image. This results in a denoised mosaiced image.

During training, the RAW denoiser learns the convolutional filters. This is done using training pairs, each consisting of a noisy and a clean image. Initially the convolutional filters are set to random values. The noisy input is input into the network, and the network regresses an output image. The difference between the regressed output image and the clean image forms an error, which is then back-propagated through the network from the output to the input though gradients. The weights of the network are then updated to reduce the error. The training process iterates using a large collection of images until the network weights converge. Once the network is trained, it can be applied to noisy images to denoise them.

Figure 5:
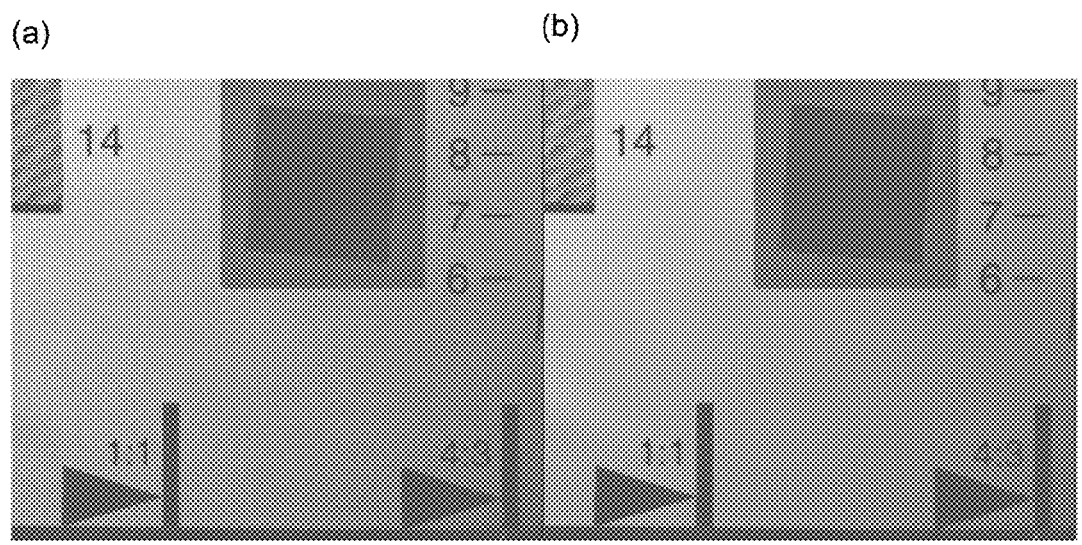
FIG. 5 illustrates the RAW denoising input and result.

FIG. 5 shows an example result of applying the RAW denoiser to an image. In FIG. 5(a), the input image is shown (after demosaicing for ease of visualization). In FIG. 5(b), the denoised image is shown (also after demosaicing). The RAW denoiser is capable of removing noise, while at the same time preserving important detail in the image.

Optional RGB denoising, as described previously, can also be performed in the pipeline, producing variations of the AISP. For example, RAW denoising can be performed before demosaicing. Alternatively, RGB denoising can be performed after demosaicing. Both RAW and RGB denoising may be performed. Other variants may have the RAW denoising block before the SL Learning module, or the RGB denoising module before the image equalizer. RAW denoising and demosaicing may also be combined into a joint operation.

The demosaicing stage performed by module 22 takes a mosaiced image, as shown in FIG. 3, as input. As discussed above, in a mosaiced image, each pixel has a red, green, or blue value. The goal of demosaicing is to produce an RGB image, where each pixel has a red, green and blue value. This is a challenging problem, because the mosaicked image only contains one third of the color values compared to the RGB image.

The simplest traditional approach to demosaicing is to interpolate to find the missing values, for example, using bilinear interpolation. This will produce a valid demosaiced result and is effective for low frequencies in the image. However, at higher frequencies, bilinear interpolation often produces artifacts such as spurious colours and zippering along edges, as the interpolation is guided only by spatial location, but not by image content. To achieve better results, methods with increasing sophistication to perform content-aware interpolation have been proposed. Although considerable progress has been made, the best demosaicing methods still produce artifacts in high frequency image regions.

The AISP deep learning approach learns how to best demosaic an image based on its content, but informed by training pairs. Here, the training pairs each consist of a RAW image, and its demosaiced RGB version. One can easily create training pairs. Given an RGB image, one can sample it using the Bayer pattern of FIG. 3(a) to produce a mosaiced version.

Figure 6:
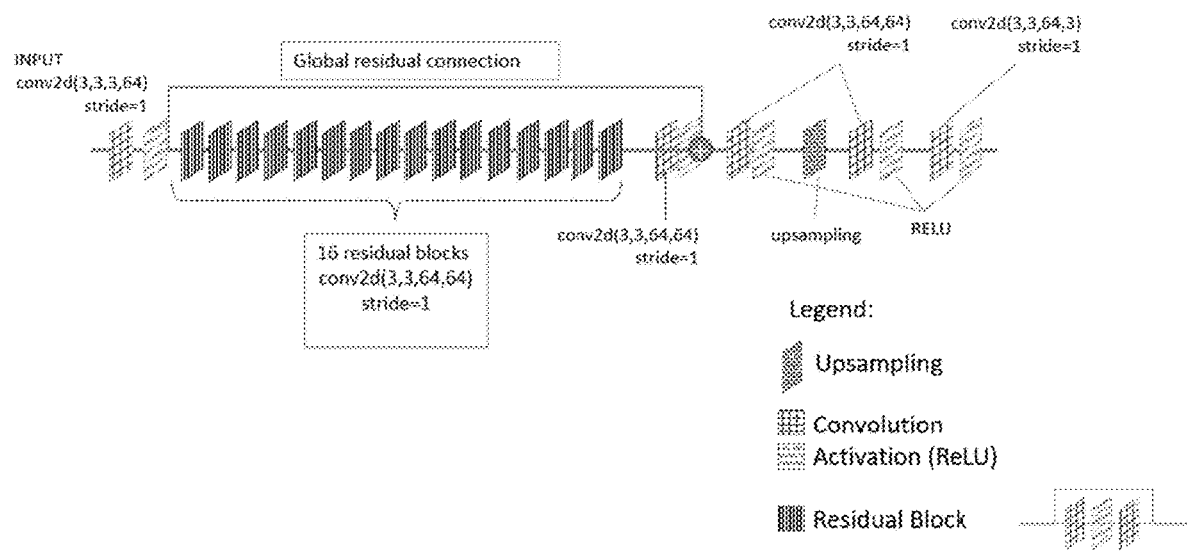
FIG. 6 illustrates a demosaicing network architecture.

A non-limiting embodiment of the demosaicing network is shown in FIG. 6. As with the RAW denoiser, the demosaicing network also consists of a number of layers that transform the data, and it relies on 3×3 convolutional filters. The input to the demosaicing network is a four-channel packed image, as shown in FIG. 3(b). This input is filtered by a 64 3×3 convolutions producing a 64-channel output, to which ReLU activation is applied. Then, 16 residual blocks are applied, each of which consists of convolution, ReLU activation, and convolution, and the result is added to the input through a skip connection. The use of residual blocks has been shown to help with gradient propagation for deeper networks. Each residual block has a 64 channel input and produces a 64 channel output. After the residual blocks, there is a global features addition through a long skip connection. This way, the transformed feature maps after the residual blocks is added to the feature maps after the initial convolution. The packed image is at half the resolution of the full RGB image. Therefore, the demosaicing network contains an upsampling layer, which increases the resolution by a factor of two in each dimension (width and height). This is performed over the 64 channels after the global features addition. Then, a final convolution and ReLU activation is applied to produce a three channel (RGB) output.

During training, the demosaicing network learns the weights used in the convolutional filters and upsampling using back-propagation, as described earlier. The training process iterates using a large collection of images until the network weights converge. Once the network is trained, it can be applied to mosaiced images to produce RGB images. In the AISP, normally the input is an image that has gone through RAW denoising.

Figure 7:
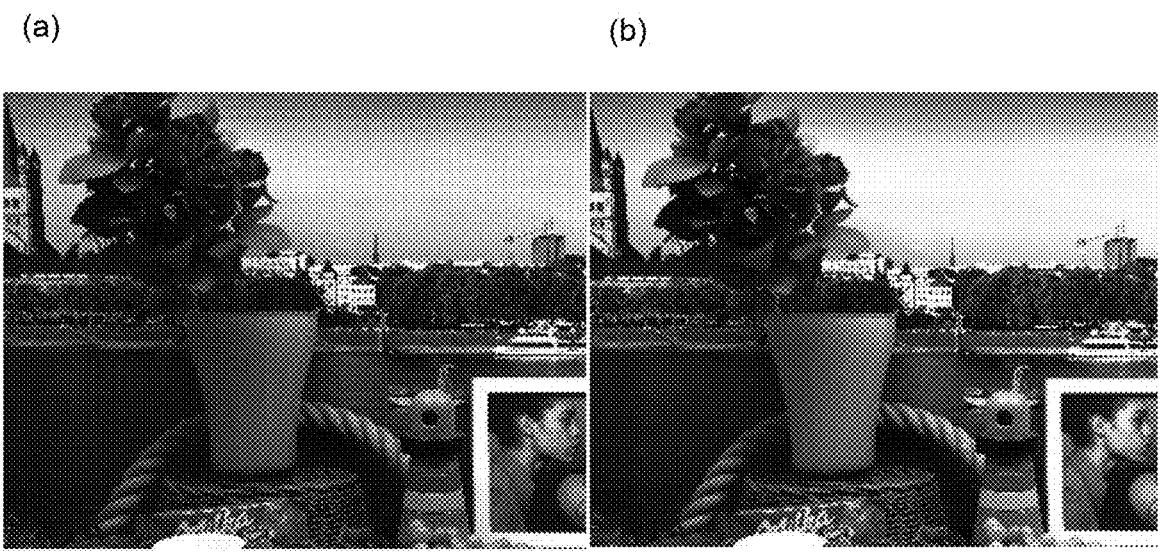
FIG. 7 illustrates a demosaicing result.

FIG. 7 illustrates a demosaicing result. FIG. 7(a) shows an image input to the demosaicing stage. The mosaiced image is visualized as a grayscale image, and due to the mosaic pattern where green pixels have a higher response than red or blue, the image appears to have a grid-like appearance. FIG. 7(b) shows the resulting RGB image after applying the demosaicing network. Vibrant colours are estimated. Both the input and output have been brightened for visualization, as the data at this stage in the AISP has a large dynamic range.

The output of the demosaicing stage is a clean, color RGB image. However, additional processing must be performed as the image will have a dynamic range that exceeds the standard 8-bit per color channel representation required for saving to a JPG file or displaying on a device (e.g. smartphone or standard monitor). The task of the image equalizer module 23 is to transform the image after demosaicing into a suitable 8-bit representation (i.e. dynamic range compression), with correct brightness, contrast, colours, and exposure. The latter is important, as bright regions should not be overexposed, and dark regions should not be underexposed.

Simple approaches to this task involve image processing steps such as tone mapping and gamma correction. The techniques each apply single mathematical equation to the image globally to adjust the overall brightness/color. While this can be effective to compress the dynamic range to an 8-bit range and achieve acceptable image quality, there can be problems with local exposure in the image.

The AISP takes an approach guided by deep learning which learns how to best transform the image based on its content, informed by training pairs. Here, the training pairs consist of a high dynamic range RGB image after demosaicing as input, and an 8-bit lower dynamic range RGB image as output. Training pairs can be generated by capturing images with a high quality camera, in both RAW and JPG format. The RAW files can be sent forward through the AISP (e.g. RAW denoising, demosaicing) to produce input for the image equalizer. The target of the regression can be the JPG image.

Figure 8:
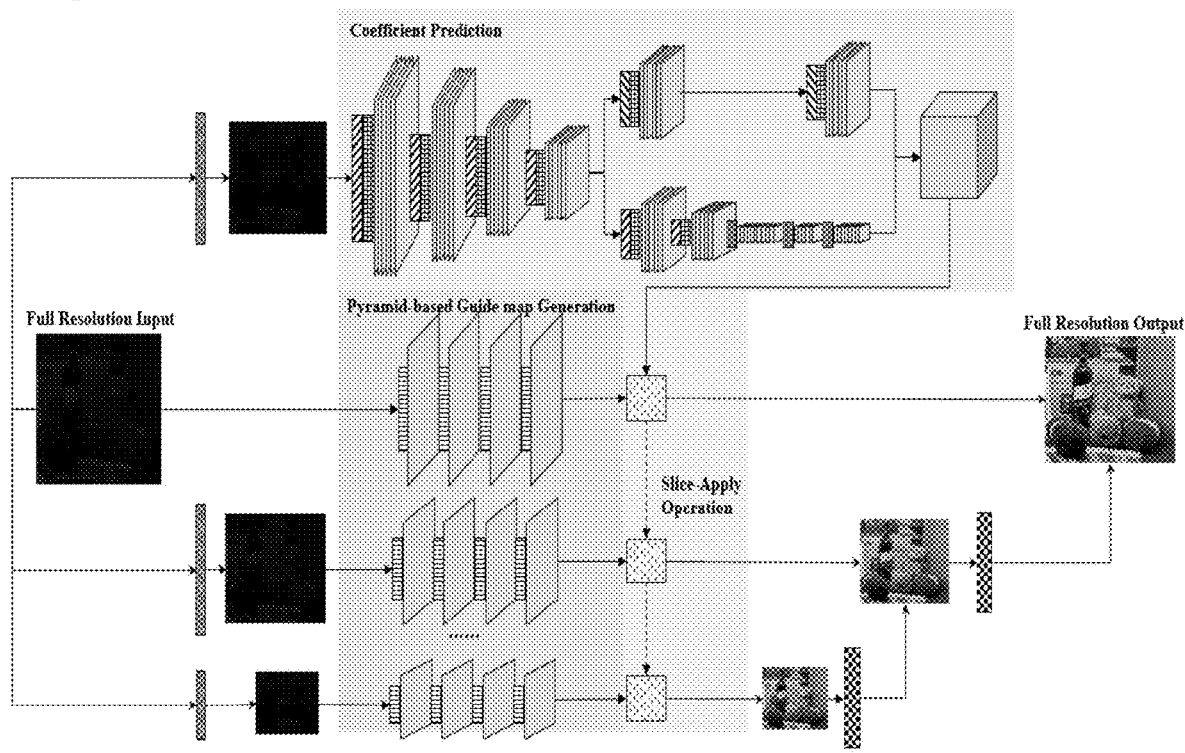
FIG. 8 illustrates an image equalizer network architecture.

A non-limiting embodiment of the image equalizer network is shown in FIG. 8. Here a full resolution input image is input to the network. It is visualized with a dark colour as the image has a large dynamic range. The image equalizer performs a multi-scale analysis of the image. Therefore, the full resolution image is downscaled to multiple smaller resolutions as represented by the smaller black boxes in FIG. 8. By processing the image at multiple scales, the method can adapt to different frequency content in the image. In the upper portion of FIG. 8, coefficients are predicted from the downsampled image. The image is transformed through multiple layers of strided convolution and rectified linear units (ReLU) to extract features. These are then input to two paths; the upper computing local features in the downsampled image using multiple layers of convolution and ReLU, similar to the networks described earlier. The lower path computes global features. In addition to strided convolution convolution and ReLU, this path uses fully connected layers to extract features from the image. The two sets of features are used to produce a bilateral grid, passed to the layer below. The lower three rows in FIG. 8 represent guidance maps, computed at different image resolutions. The guidance maps instruct the network how to apply local colour transforms from using the image and bilateral grid. The inference is performed coarse-to-fine, first processing the lower resolutions before estimating the full resolution output.

During training, the image equalizer network learns the weights used in the convolutional filters and fully convolutional layers. The training process iterates using a large collection of images until the network weights converge. Once the network is trained, it can be applied to high dynamic range RGB images to produce 8-bit dynamic range images, with appropriate brightness and colour.

Figure 9:
FIG. 9 illustrates a result of the image equalizer network.
Figure 9:

FIG. 9 illustrates an image equalizer result. FIG. 9(a) shows an image input to this stage (brightened for visualization). After demosaicing, the RGB image has a large dynamic range, and in this visualization some parts of the image are underexposed (water left of the plant) and others are overexposed (sky in the background). FIG. 9(b) shows the output of this stage. The image brightness has been corrected, and the colors and exposure are improved.

Figure 10:
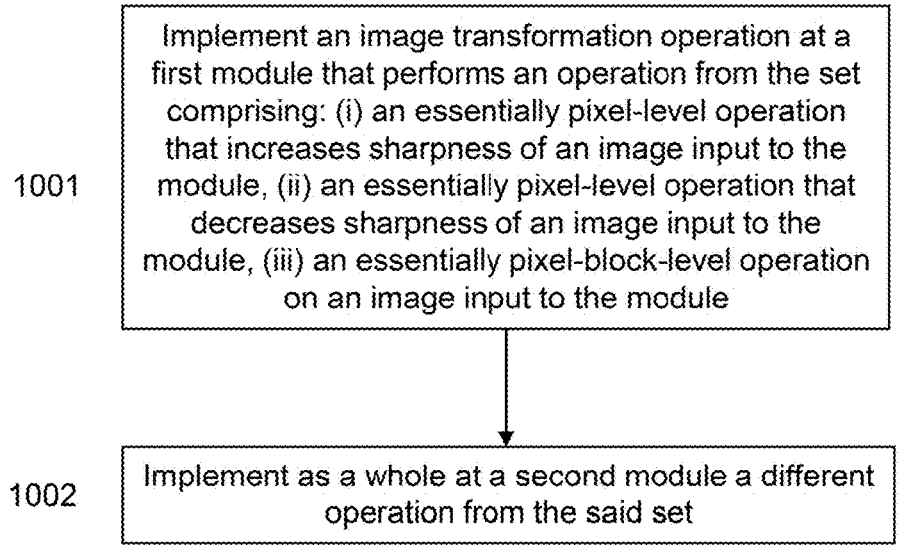
FIG. 10 shows an example of method for refining a raw image captured by a camera in an image processor according to embodiments of the present invention.

FIG. 10 summarises a method for refining a raw image captured by a camera in an image processor in accordance with embodiments of the present invention. As described above, the image processor comprising a plurality of modules configured to operate in series, the modules comprising a first module and a second module, each of which independently implements a respective trained artificial intelligence model. In step 1001, the method comprises implementing an image transformation operation at the first module that performs an operation from the set comprising: (i) an essentially pixel-level operation that demosaics an image input to the module, (ii) an essentially pixel-level operation that denoises an image input to the module, (iii) an essentially pixel-block-level operation on an image input to the module. The next step at 1002 comprises implementing as a whole at the second module a different operation from the said set.

Figure 11:
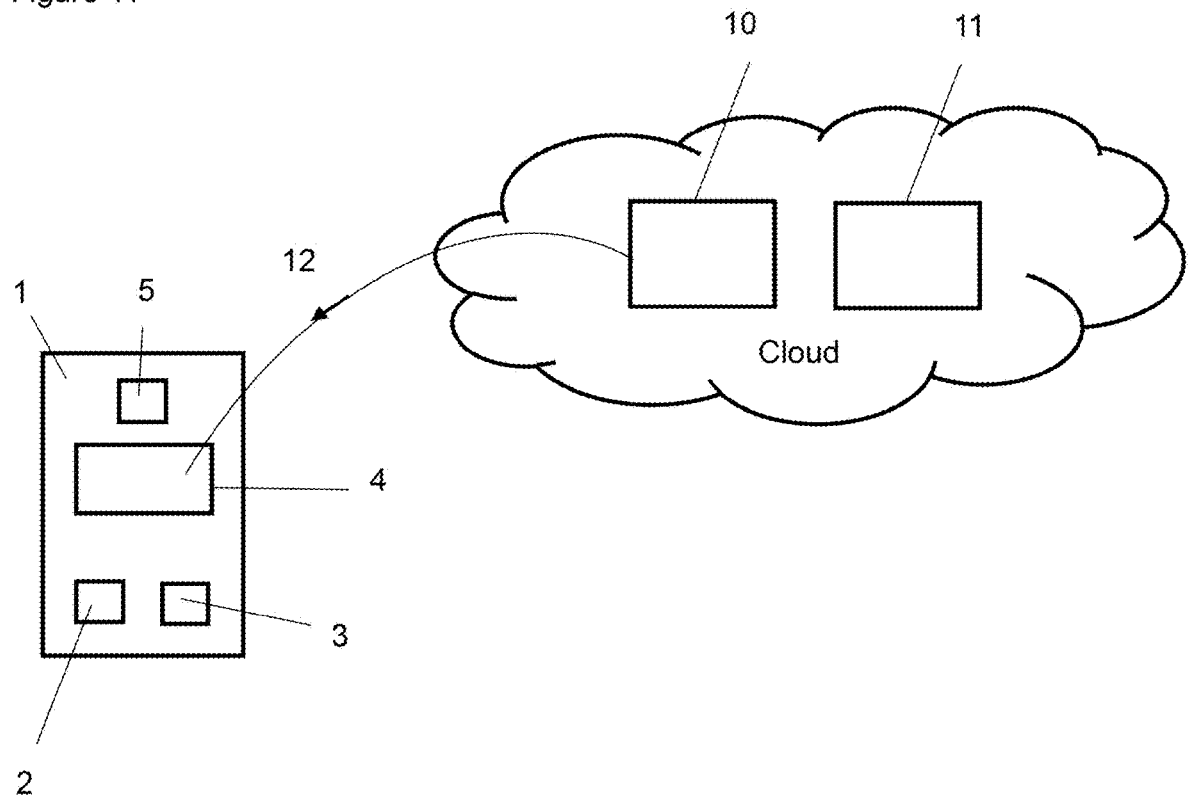
FIG. 11 shows an example of a camera configured to use the ISP of embodiments of the present invention to process images taken by an image sensor in the camera.

FIG. 11 shows an example of a camera configured to use the AISP to process images taken by an image sensor in the camera. Such a camera 1 typically includes some onboard processing capability. This could be provided by the processor 4. The processor 4 could also be used for the essential functions of the device.

The transceiver 5 is capable of communicating over a network with other entities 10, 11. Those entities may be physically remote from the camera 1. The network may be a publicly accessible network such as the internet. The entities 10, 11 may be based in the cloud. Entity 10 is a computing entity. Entity 11 is a command and control entity.

These entities are logical entities. In practice they may each be provided by one or more physical devices such as servers and datastores, and the functions of two or more of the entities may be provided by a single physical device. Each physical device implementing an entity comprises a processor and a memory. The devices may also comprise a transceiver for transmitting and receiving data to and from the transceiver 5 of camera 1. The memory stores in a non-transient way code that is executable by the processor to implement the respective entity in the manner described herein.

The command and control entity 11 may train the artificial intelligence models used in each module of the AISP. This is typically a computationally intensive task, even though the resulting model may be efficiently described, so it may be efficient for the development of the algorithm to be performed in the cloud, where it can be anticipated that significant energy and computing resource is available. It can be anticipated that this is more efficient than forming such a model at a typical camera.

In one implementation, once the deep learning algorithms have been developed in the cloud, the command and control entity can automatically form a corresponding model and cause it to be transmitted to the relevant camera device. In this example, the ISP is implemented at the camera 1 by processor 4.

In another possible implementation, an image may be captured by the camera sensor 2 and the image data may be sent by the transceiver 5 to the cloud for processing in the AISP pipeline. The resulting target image could then be sent back to the camera 1, as shown at 12 in FIG. 11.

Therefore, the method may be deployed in multiple ways, for example in the cloud, on the device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g. using an inference engine. The AISP may also be implemented at the camera, in a dedicated piece of hardware, or in the cloud.

The proposed approach is different to previous solutions as it is based on deep learning, which learns from large datasets. The stages in the AISP are based on deep convolutional neural networks, which take an image as input, and produce an output image using regression.

The AISP approach described herein also has the advantage that there are fewer stages of processing. For example, a single stage in the AISP, the image equalizer of module 23 in FIG. 2, can learn a non-linear mapping to transform colors. In a traditional ISP, achieving color transformation normally requires multiple stages including high dynamic range compression, tone mapping, and saturation adjustment.

The AISP also achieves better handling of variation. Digital photographs have a large amount of variation, for example, they can be taken under varying conditions such as indoor/outdoor, daytime/night-time, zoomed in/out, etc. and the content in the photo can vary hugely. It is difficult for traditional algorithms to work consistently across these sources of variation. However, by learning from rich examples, deep learning methods can produce high quality results adaptively based on image content.

Furthermore, there are limited, and in some cases no, parameters to tune. Deep learning models have a large number of parameters, however, these parameters are learned automatically during training. Components in a traditional ISP expose parameters that must be tuned, either manually or algorithmically. Parameters adjusted in the early stages of an ISP affect all the later stages, making ISP tuning a complicated exercise.

There are also advantages in the hardware required to implement embodiments of the invention. Traditional ISPs are implemented on dedicated application-specific integrated circuits (ASICs). These are expensive to develop and require dedicated chips to be included with the device. The AISP can be implemented on generic neural processing units (NPUs), saving the expense and complication of developing custom ISP chips for inclusion on the device. The entire pipeline may be implemented on a single chip.

The approach described herein also results in improved image quality. Deep learning has been shown to outperform traditional methods in most image enhancement tasks.

The AISP includes multiple separate stages with a modular design, having dedicated modules for learning important operations such as SL learning, denoising, and sharpening. Intermediate results can be inspected, which aids in debugging and interpretation of data passing through the AISP.

Thus, the AISP described herein produces high quality images with minimal artefacts and has a modular design with a small set of processing stages.

The approach is applicable to both still photography and video. The AISP is designed primarily for normal and low light images.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of embodiments of the present invention may consist of any such individual feature or combination of features. In view of the foregoing description it will be evident to a person skilled in the art that various modifications may be made within the scope of the invention.

What is claimed is:

1. An image processor comprising:
a plurality of microprocessors configured to operate in series to refine a raw image captured by a camera, the plurality of microprocessors comprising a first microprocessor, a second microprocessor, and a third microprocessor, wherein the first microprocessor implements a first convolutional neural network (CNN), the second microprocessor implements a second CNN and the third microprocessor implements a third CNN, wherein the first, second, and third CNNs are independently trained, wherein:
the first microprocessor is configured to implement a first image transformation operation that either demosaics or denoises a first image input to the first microprocessor using the first CNN;
the second microprocessor is configured to implement a second image transformation operation that demosaics or denoises a second image input to the second microprocessor using the second CNN;
the third microprocessor is configured to perform image equalizing on a third image input to the third microprocessor using the third CNN; and
each of the plurality of microprocessors, except for the first microprocessor, is configured to take an input from a preceding microprocessor so that the second image input to the second microprocessor has previously been demosaiced or denoised by the first image transformation operation implemented by the first microprocessor on the first image input, and the third image input to the third microprocessor has previously been demosaiced and denoised by the first image transformation operation implemented by the first microprocessor on the first image input and by the second image transformation operation implemented by the second microprocessor on the second image input.

2. The image processor as claimed in claim 1, wherein the plurality of microprocessors is configured to perform an automatic white balancing operation prior to demosaicing an image.

3. The image processor as claimed in claim 1, wherein the plurality of microprocessors is configured to perform demosaicing of the image after de-noising the image.

4. The image processor as claimed in claim 1, wherein each of the first and second image transformation operations is an essentially pixel-level operation.

5. The image processor as claimed in claim 1, wherein the image equalizing performed by the third microprocessor is an essentially pixel-block-level operation that comprises colour mapping.

6. The image processor as claimed in claim 1, wherein the image processor is configured to generate an output that is a compressed representation of the first image input.

7. The image processor as claimed in claim 1, wherein the plurality of microprocessors further comprises a fourth microprocessor configured to perform multi-frame noise reduction.

8. The image processor as claimed in claim 1, wherein the plurality of microprocessors further comprises a fourth microprocessor configured to increase the contrast to noise ratio of short exposure images.

9. The image processor as claimed in claim 1, wherein the plurality of microprocessors further comprises a fourth microprocessor configured to enhance detail in the image.

10. The image processor as claimed in claim 1, wherein the plurality of microprocessors further comprises a fourth microprocessor configured to perform super-resolution of the image.

11. The image processor as claimed in claim 1, wherein the plurality of microprocessors further comprises a fourth microprocessor configured to perform an image sharpening operation.

12. The image processor as claimed in claim 1, wherein the first or second CNN used by the respective microprocessor to demosaic the respective input image is trained to demosaic the respective input image based on the content thereof.

13. A method for refining a raw image captured by a camera, wherein the method is applied to an image processor comprising a plurality of microprocessors configured to operate in series, wherein the plurality of microprocessors comprises a first microprocessor, a second microprocessor, and a third microprocessor, and wherein the first microprocessor implements a first convolutional neural network (CNN), the second microprocessor implements a second CNN, and the third microprocessor implements a third CNN, wherein the first, second and third CNNs are independently trained, the method comprising:
implementing, by the first microprocessor, a first image transformation operation that either demosaics or denoises a first image input to the first microprocessor using the first CNN;

implementing, by the second microprocessor, a second image transformation operation that demosaics or denoises a second image input to the second microprocessor using the second CNN; and performing, by the third microprocessor, image equalizing on a third image input to the third microprocessor using the third CNN; and wherein each of the plurality of microprocessors, except for the first microprocessor, is configured to take an input from a preceding microprocessor so that the second image input to the second microprocessor has previously been demosaiced or denoised by the first image transformation operation implemented by the first microprocessor on the first image input, and the third image input to the third microprocessor has previously been demosaiced and denoised by the first image transformation operation implemented by the first microprocessor on the first image input and by the second image transformation operation implemented by the second microprocessor on the second image input.

14. The method as claimed in claim 13, wherein the plurality of microprocessors operating in series further perform an automatic white balancing operation prior to demosaicing an image.

15. The method as claimed in claim 13, wherein the plurality of microprocessors operating in series further perform demosaicing of the image after de-noising the image.

16. The method as claimed in claim 13, wherein each of the first and second image transformation operations is an essentially pixel-level operation.

17. The method as claimed in claim 13, wherein the image equalizing performed by the third microprocessor is an essentially pixel-block-level operation that comprises colour mapping.

18. The method as claimed in claim 13, further comprising:
generating an output that is a compressed representation of the first image input.

19. A device comprising:
a chip integrated with a plurality of neural processors thereon;
the plurality of neural processors are configured to operate in series to refine a raw image captured by a camera,
wherein the plurality of neural processors comprises a first neural processor, a second neural processor, and a third neural processor,
wherein each of the first neural processor implements a first convolutional neural network (CNN), the second neural processor implements a second CNN, and the third neural processor implements a third CNN, and the first, second and third CNNs are independently trained, and
the first neural processor is configured to implement a first image transformation operation that either demosaics or denoises a first image input to the first neural processor using the first CNN;
the second neural processor is configured to implement a second image transformation operation that demosaics or denoises a second image input to the second neural processor using the second CNN;
the third neural processor is configured to perform image equalizing on a third image input to the third neural processor using the third CNN; and
each of the plurality of neural processors, except for the first neural processor, is configured to take an input from a preceding neural processor so that the second image input to the second neural processor has previously been demosaiced or denoised by the first image transformation operation implemented by the first neural processor on the first image input, and the third image input to the third neural processor has previously been demosaiced and denoised by the first image transformation operation implemented by the first neural processor on the first image input and by the second image transformation operation implemented by the second neural processor on the second image input.

* * * * *

UNITED STATES PATENT AND TRADEMARK OFFICE
CERTIFICATE OF CORRECTION

| | | |
|---|---|---|
| PATENT NO. | : 11,625,815 B2 | |
| APPLICATION NO. | : 17/030038 | |
| DATED | : April 11, 2023 | |
| INVENTOR(S) | : Slabaugh et al. | |

It is certified that error appears in the above-identified patent and that said Letters Patent is hereby corrected as shown below:

In the Claims

Claim 19: Column 14, Line 9: "wherein each of the first neural processor implements a" should read -- wherein the first neural processor implements a --.

Signed and Sealed this
Eleventh Day of July, 2023

Katherine Kelly Vidal
*Director of the United States Patent and Trademark Office*